(12) United States Patent
Kannan et al.

(10) Patent No.: US 8,161,399 B2
(45) Date of Patent: Apr. 17, 2012

(54) AUTOMATED LEARNING SYSTEM FOR IMPROVING GRAPHICAL USER INTERFACES

(75) Inventors: Ramakrishnan Kannan, TamilNadu (IN); Anbazhagan Mani, Austin, TX (US); Karthik Subbian, Karnataka (IN); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1226 days.

(21) Appl. No.: 11/625,293

(22) Filed: Jan. 20, 2007

(65) Prior Publication Data

US 2008/0178102 A1 Jul. 24, 2008

(51) Int. Cl.
*G06F 3/048* (2006.01)
*G06F 15/177* (2006.01)

(52) U.S. Cl. ............... 715/764; 715/736; 715/843
(58) Field of Classification Search .......... 715/764, 715/736; 714/736
See application file for complete search history.

(56) References Cited

U.S. PATENT DOCUMENTS

| | | | |
|---|---|---|---|
| 5,265,193 A | | 11/1993 | Grady et al. |
| 5,276,776 A | | 1/1994 | Grady et al. |
| 5,615,341 A | * | 3/1997 | Agrawal et al. ............. 705/7.29 |
| 5,740,408 A | | 4/1998 | Bonne et al. |
| 5,926,638 A | | 7/1999 | Inoue |
| 6,011,555 A | * | 1/2000 | Eckhoff et al. ............... 715/843 |
| 6,134,690 A | * | 10/2000 | Ivaturi et al. .................. 714/736 |
| 6,766,475 B2 | | 7/2004 | Segal et al. |
| 6,865,573 B1 | * | 3/2005 | Hornick et al. .............. 707/748 |
| 7,184,524 B2 | * | 2/2007 | Digate et al. ............. 379/88.17 |
| 7,552,390 B1 | * | 6/2009 | Sherer .......................... 715/744 |
| 7,634,735 B2 | * | 12/2009 | McCary ....................... 715/741 |
| 2004/0021678 A1 | * | 2/2004 | Ullah et al. .................... 345/700 |
| 2005/0216300 A1 | * | 9/2005 | Appelman et al. ............... 705/1 |
| 2008/0154448 A1 | * | 6/2008 | Mead et al. ..................... 701/14 |

OTHER PUBLICATIONS

"Apriori algorithm" Wikipedia, retrieved Nov. 1, 2006, pp. 1-2. http://en.wikipedia.org/wiki/Apriori_algorithm.
Agrawal et al., "Mining Association Rules between Sets of Items in Large Databases", ACM pp. 207-216, retrieved Nov. 1, 2006. http://portal.acm.org/ft_gateway.cfm?id=170072&type=pdf&coll=GUIDE&dl=portal, ACM&CFID=11111111&CFTOKEN=2222222.

* cited by examiner

*Primary Examiner* — Boris Pesin
*Assistant Examiner* — Elizabeth G Wright
(74) *Attorney, Agent, or Firm* — Yee & Associates, P.C.; Steven L. Bennett

(57) ABSTRACT

An automated learning system for improving graphical user interfaces. Information about a user transaction which caused an error is obtained from an input to an element in a graphical user interface. Associations are created between the error and one or more elements in the graphical user interface which generated the error to form association rules. The association rules are applied to a set of control rules to create user interface preference rules. A corrective action may then be performed on the one or more elements in the graphical user interface according to the user interface preference rules.

17 Claims, 4 Drawing Sheets

| TRANSACTION ID | ErrorCode: UI ELEMENTS THAT GENERATED THE ERROR |
|---|---|
| T1 | E1:u1,u3 |
| T2 | E2:u2 |
| T3 | E3:u1 |
| T4 | E3:u1 |
| T5 | E3:u1 |
| T6 | E2:u2 |
| T7 | E3:u1 |
| T8 | E2:u2 |

|    | E1 | E2 | E3 | U1 | U2 | U3 |
|----|----|----|----|----|----|----|
| T1 | 1  | 0  | 0  | 1  | 0  | 1  |
| T2 | 0  | 1  | 0  | 0  | 1  | 0  |
| T3 | 0  | 0  | 1  | 1  | 0  | 0  |
| T4 | 0  | 0  | 1  | 1  | 0  | 0  |
| T5 | 0  | 0  | 1  | 1  | 0  | 0  |
| T6 | 0  | 1  | 0  | 0  | 1  | 0  |
| T7 | 0  | 0  | 1  | 1  | 0  | 0  |
| T8 | 0  | 1  | 0  | 0  | 1  | 0  |

AUTOMATED LEARNING SYSTEM FOR IMPROVING GRAPHICAL USER INTERFACES

BACKGROUND OF THE INVENTION

1. Field of the Invention

The present invention relates generally to an improved data processing system, and in particular, to an automated learning system for improving graphical user interfaces.

2. Description of the Related Art

Graphical user interfaces, or "GUIs" as they are often designated, are interface systems, including devices, by which a user interacts with a system, system components, and/or system applications. One of the many advantages of such GUIs is that they allow a user to create and edit documents and structures in a graphical manner by selecting and manipulating graphical display elements, such as icons, usually with a pointing device, such as a mouse. The Apple Macintosh user interface, Microsoft Windows operating environment, and UNIX X-Windows are common and very popular examples of GUIs, illustrating the fact that the advantages of GUIs over conventional text-based user interfaces are widely recognized.

Frequently, users interact with various graphical user interfaces and may type large amounts of information into the input screens. While a user may navigate through the various input screens successfully, there are many situations wherein the user is prevented from moving through the screens due to an error, wherein the error is caused by the input of invalid or illegal values into the screen. For instance, consider the example of a web page containing a service registration form which is presented to a user. The registration form may contain a "username" field which is to be filled in by the user. In this example, the "username" field in the service registration form is a text box. When the user enters text into the "username" text box, the application behind the web page expects the input value to be a valid email address. If the user enters a username other than an expected email address, the system notifies the user of the error. The user is required to correct the error, and then re-submit the form with a proper username entry in order to be able to successfully navigate through the screens. Although the error encountered by the user may be a common error across a wide range of users, conventional graphical user interface applications, as described in the example above, do not provide for using these errors as learning tools to control and improve graphical user interfaces controls.

SUMMARY OF THE INVENTION

The illustrative embodiments provide an automated learning system for improving graphical user interfaces. Information about a user transaction which caused an error is obtained from an input to an element in a graphical user interface. Associations are created between the error and one or more elements in the graphical user interface which generated the error to form association rules. The association rules are applied to a set of control rules to create user interface preference rules. A corrective action may then be performed on the one or more elements in the graphical user interface according to the user interface preference rules.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
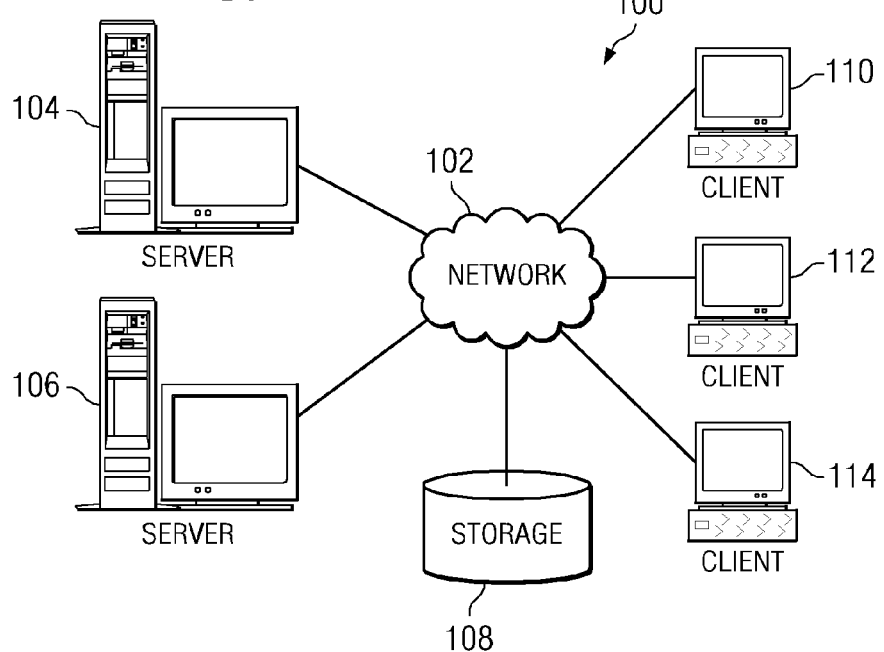
FIG. 1 depicts a pictorial representation of a distributed data processing system in which the illustrative embodiments may be implemented.
Figure 2:
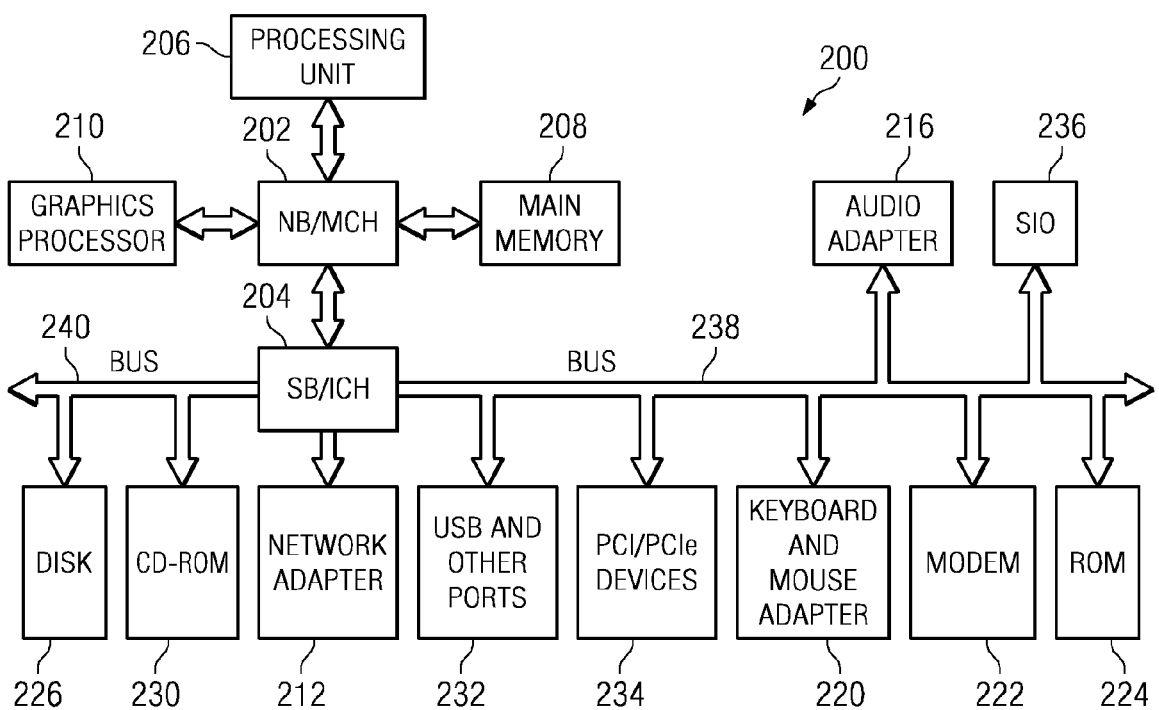
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide an automated learning system for improving graphical user interfaces. In particular, the illustrative embodiments provide an automated method for detecting graphical user interface issues (i.e., input errors) and converting the issues to a form of knowledge. This knowledge may then be used to automatically or dynamically improve graphical user interface controls, as well as make proactive recommendations for graphical user interface improvement and alternative design to graphical user interface developers. These recommendations may be based on mathematical association rules and user interface preference lists. In this manner, graphical user interface controls and components may be intelligently changed such that a next user of the graphical user interface has a higher probability of successfully navigating through the screens without generating input errors.

The solution provided in the illustrative embodiments comprises three operational stages. In the first stage, the method in the illustrative embodiments generates a list of input errors encountered in transactions involving a graphical user interface. In the second stage, the graphical user interface transactions are transformed into association rules. The transformation may comprise defining a method or algorithm to be used to convert various graphical user interface related errors into rules which associate the error to a particular user interface element which generated the error. In the third stage, the association rules created in the second stage are converted to graphical user interface preference lists. The preference lists are then applied to user-defined graphical user interface controls to identify the best suited elements for the user interface.

Figures 3, 4:
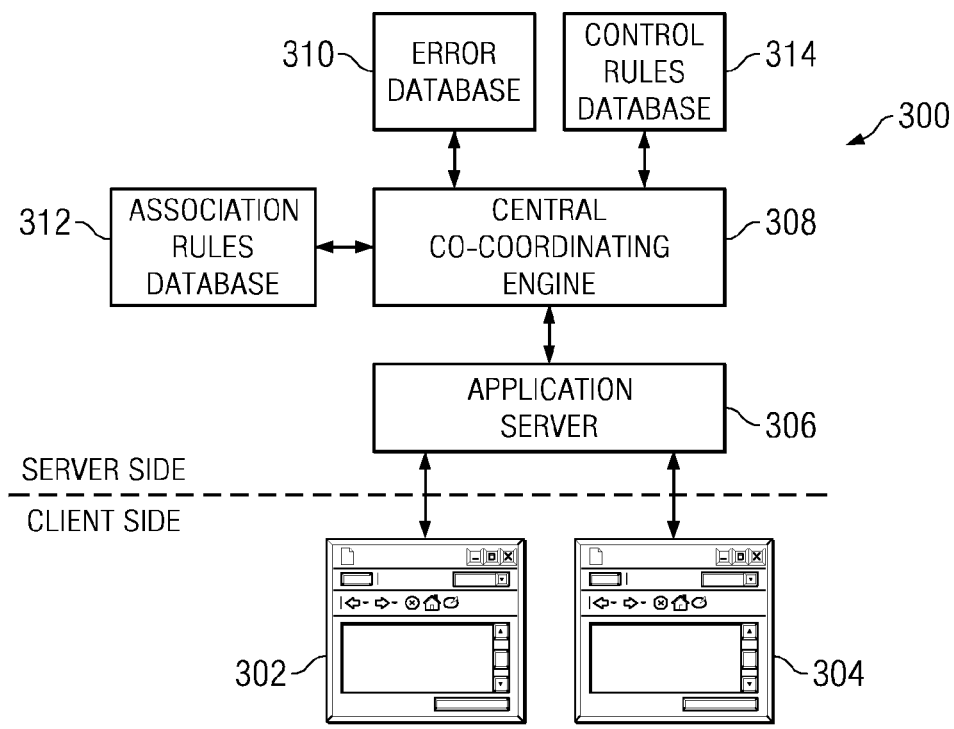
FIG. 3 is a block diagram of exemplary components with which the illustrative embodiments may be implemented.
FIG. 4 is a diagram of an example graphical user interface in accordance with the illustrative embodiments.

FIG. 3 is a block diagram of exemplary components with which the illustrative embodiments may be implemented. The components shown in FIG. 3 comprise automated learning system which may be implemented in a data processing system, such as data processing system 100 in FIG. 1. The client side comprises various graphical user interfaces 302 and 304. The server-side, where the automated learning system 300 is implemented, comprises application server 306, central co-coordinating engine 308, error database 310, association rules database 312, and control rules database 314.

In this particular example, graphical user interfaces 302 and 304 are web pages presented to a user in which the user inputs information, although other types of graphical user interfaces may be used. If the user provides an invalid input into an element in graphical user interface 302, application server 306 gathers a list of inputs which generated errors in transactions occurring in the user interface.

Central co-coordinating engine 308 interacts with application server 306 to gather information regarding the list of errors in graphical user interface 302, as well as control interactions among the other components. The transaction information gathered may include the types of errors and the corresponding user interface elements which generated the errors. Central co-coordinating engine 308 stores error codes in error database 310 for each transaction which comprised a user interface element that caused an error. Central co-coordinating engine 308 also transforms the transaction information obtained from application server 306 into association rules by creating rules which specify an association between each error and one or more particular user interface elements which generated the error. Central co-coordinating engine 308 stores the association rules in association rules database 312.

Central co-coordinating engine 308 accesses defined rules for changing the elements within graphical user interfaces 302 and 304 in control rules database 314. Control rules database 314 comprises control rules which specify when and how elements within graphical user interfaces 302 and 304 should be changed to prevent other users from providing input which has previously caused errors. The control rules also comprise preference lists which specify user preferred changes to be made to the graphical user interface if a particular error is generated. Based on the control rules in control rules database 314, central co-coordinating engine 308 may interact with application server 306 to perform corrective changes on graphical user interfaces 302 and 304 to prevent the same errors from occurring on the interfaces.

FIG. 4 is a diagram of an example graphical user interface in accordance with the illustrative embodiments. In this illustrative example, graphical user interface 400 is an example web page containing a registration form presented to a user. The registration form is shown to contain various user interface elements, including username (u2) 402, password (u4) 404, address1 (u5) 406, address 2 (u6) 408, state (u3) 410, and zip code (u1) 412. When the user enters text into username 402 text box, the application behind the web page processes the input and determines if the input is a valid input. In this example, the valid input for username (u2) 402 text box is an email address in the form "x@y.com", where x is the name or identifier of the user, and y is the service provider name or identifier. If the user input is not in the form of a valid email address, the application determines that an error has occurred in username (u2) 402 element. For instance, new registrants may mistakenly enter their name or some other identifier, rather than a valid email address as required by the username (u2) text box 402. Likewise, if zip code (u1) 412 defaults to "empty space" to accommodate non-U.S. countries, a new registrant may mistakenly fail to enter an appropriate zip code which corresponds to the user input entered in state (u3) 410 text box. The illustrative embodiments allow these errors to be captured and converted to a form of learning, thereby allowing design improvements to be made to user interface screens to facilitate easy and unambiguous data entry. For example, in this case, a redesign improvement to prevent the same username input errors may include redesigning username (u2) 402 text box to be two text boxes and one drop-down box. One text box may be used for the username (x), one text box may be used for the service provider name (y), and the drop down box may be used for the domain name (e.g., .com, .net, .in, .org). Thus, the redesign of username (u2) 402 text box may improve the chances that a subsequent user inputting username information into the form will know to provide a valid email address into the form, rather than other invalid identifier information.

Figures 5, 6, 7:
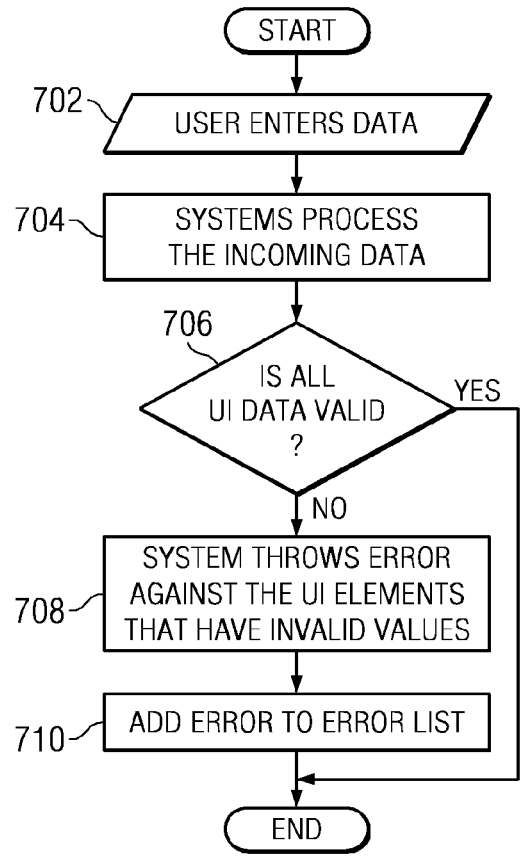
FIG. 5 is an example graphical user interface error repository in accordance with the illustrative embodiments.
FIG. 6 is an example sparse matrix in accordance with the illustrative embodiments.
FIG. 7 is a flowchart of a process for creating a graphical user interface error repository in accordance with the illustrative embodiments.

FIG. 5 is an example error transaction database table in accordance with the illustrative embodiments. In error transaction database table 500, each transaction is recorded from each user using the graphical user interface. For every transaction ID, the corresponding error codes and user interface elements that are responsible for the errors are populated in the database. Error transaction database table 500 may be implemented on the server-side as an error database component, such as error database 310 in FIG. 3.

When an error occurs on a graphical user interface such as graphical user interface 400 in FIG. 4, an error code is logged to error transaction database table 500 for each user interface element that caused the error. In this illustrative example, E1 is the error code for an invalid state-zip code combination, E2 is the error code for an illegal user name, and E3 is the error code for an invalid zip code. Using these error codes, error transaction database table 500 shows multiple transactions (T1-T8) and their corresponding error codes for the respective elements. For instance, an error was logged to error transaction database table 500 for transaction T1 502, which contains error code E1 for user interface elements u1 and u3. Thus, the error code indicates that the user input an invalid state-zip code combination in state (u3) 410 and zip code (u1) 412 text boxes in FIG. 4. Likewise, an error was logged for transaction T2 502, the code reflecting that the user input an invalid user name in username (u2) 402 text box in FIG. 4.

Association rules may be created from the error transactions logged in error transaction database table 500 by converting the error transactions into a sparse matrix. FIG. 6 is an example sparse matrix in accordance with the illustrative embodiments. A sparse matrix is a rectangular array of elements set out by rows and columns, wherein the elements of the matrix are mostly zero-filled. Sparse matrix 600 is a dynamically created and destroyed data structure, at run-time, by a program (or algorithm) running in central co-coordinating engine 308 in FIG. 3. Sparse matrix 600 comprises a list of transactions (e.g., T1-T8), and each column comprises the error (if any) and the corresponding user interface element which caused the error in the row where an error is located. For example, transaction T1 comprises an error E1 which occurred in user interface elements U1 and U3.

Central co-coordinating engine 308 in FIG. 3 may execute an association rule mining algorithm to identify error/element sets which occur frequently. Any known mining algorithm may be used, such as Partition, Apriori, Pincer-Search, etc. The mining algorithm may use user-specified configuration quantities, such as, for example, support and/or confidence as part of the algorithm. For instance, the error database table, such as error database table 500 in FIG. 5, records all errors that occur in the graphical user interface. However, the common errors may also be tracked. If 100 people are using the interface, a common error may be defined as some event which is performed by more than X number of people out of the 100 people using the interface. Thus, support refers to the minimum percentage of frequency that must be met for an item (i.e., an error) to qualify for further processing. Confidence refers to the minimum percentage of confidence that a particular user interface element has caused a particular error that must be met for an item to qualify for further processing.

The Apriori mining algorithm is used in this illustrative example to identify frequent error/element sets in sparse matrix 600. The definitions in the Apriori mining algorithm include the following:

Ci=candidate set in iteration i

Li=result item set with i element where freq≧support

The candidate set in the first iteration (C1) comprises a set of all possible elements in sparse matrix 600. The result item set in the first iteration (L1) includes only those elements in candidate set (C1) which meet the freq≧support requirement (i.e., where the frequency of the item is greater than or equal to the support percentage configured by the user). In this example, the user-specified configuration support is 30% and the confidence is 90%, so for the 8 transactions (T1-T8) of the graphical user interface, at least 2 of the transactions should encounter the same error for an error to qualify to be in the result item set (L1). Thus, C1 and L1 comprise:

C1={E1, E2, E3, u1, u2, u3, u4}

L1={E2, E3, u1, u2}

The candidate set in the second iteration (C2) comprises all possible combinations of the elements in item set (L1). The item set in the second iteration (L2) includes only those elements in candidate set (C2) which meet the freq≧support requirement. Only E2 and E3 meet the support=30% user-specified requirements. Thus, C2 and L2 comprise:

C2={(E2,u1), (E2,u2), (E2,E3), (E3,u1), (E3, u2), (u1,u2)}

L2={(E2,u2), (E3,u1)}

In the third iteration, however, the multiplication combinations of elements from item set (L2) results in no available candidate sets. Thus, (C3) comprises:

C3={0} and the algorithm stops.

The error/element sets in the latest iteration are identified as the frequent item sets. In this case, the frequent item sets are in item set (L2), which comprise error/element set (E2,u2) and error/element set (E3,u1). Only frequent item sets comprising one error element and remaining user interface elements are of interest. In other words, the association rules between error-to-GUI elements are of interest, rather than the associations between the error-to-error elements or between GUI-to-GUI elements. Thus, whenever a candidate set is generated, the mining algorithm allows checking for at least one error element and one GUI element in the generated candidate set. If the candidate set comprises otherwise, the set is not processed any further, thereby avoiding redundant iterations during "pruning" (in the case of using the Apriori mining algorithm) or during candidate generation.

Once the error/element sets that occur frequently are identified, user-defined association rules may be created which specify the association of the error in the frequent item set to the user interface element in the item set. For instance, using user-specified configuration quantities such as support=30% and confidence=90% as part of the algorithm, two associations may be generated as follows for frequent item set (L2):

Association Rule 1: E2=>u2 (Support=(3/8)*100%=37.5% Confidence=100%)

Association Rule 2: E3=>u1 (Support=(4/8)*100%=50%) Confidence=100%)

Association rule 1 specifies that an illegal or invalid user name error (E2) occurs for user interface element "user name" (u2) at a frequency of 37.5%. In other words, approximately 3 out of 8 transactions encountered error E2. Association rule 2 specifies that an invalid zip code error (E3) occurs for the combination (u1) of user interface elements "state" and "zip code" at a frequency of 50%, or one-half of all transactions.

After the user-defined association rules are created for the frequent item set, a "make preference" algorithm is called. The "make preference" algorithm converts the association rules to a graphical user interface preference list. This conversion may be performed by taking the frequency level of an item set and converting that frequency level into a preference priority. Thus, the higher the frequency level, the higher preference priority will be chosen for the item set. It should be noted that the priority preference selection may also be user-configurable. The preference list may be implemented as user interface preferences rules, which may be provided to a developer developing or designing the user interface form, or which may be used to dynamically implement the user interface form. Consider for example, a user who specifies a control rule in the database as follows:

```
<controlrule>
    <error name='E2'>
        <input type ='textbox' />
        <rule action ="implementation" name="rule1"
/>
    </error>
</controlrule>
<rulesdb>
<rule1>
    <preference priority='1'>
    Change input type from text box to drop-down list
box
    </preference>
    <preference priority='2'>
    Change input type from text box to Multi-line
text box
    </preference>
</rule1>
</rulesdb>
```

The control rule above specifies that an invalid user name (E2) error will cause Rule1 to be implemented. In this particular example, Rule1 comprises two options which allow for dynamically changing the user interface form. One option has a preference priority of "1" and changes the input type of a text box on the user interface form to a drop-down list box. The other option has a preference priority of "2" and changes the input type from a text box to a multi-line text box. If the user preference specifies that an (E2) error which implemented Rule1 has a preference priority of "1", then the input type is changed from a text box to a drop-down list box. If the user preference specifies that an (E2) error which implemented Rule1 has a preference priority of "2", then the input type is changed from a text box to a multi-line text box.

Instead of dynamically changing the user interface, the rules may also specify that a text message should be sent to an appropriate user interface developer, who then may develop the form based on the preference rules. This notification may be performed by changing the rule action attribute value to "email" in the rule tag.

Figure 8:
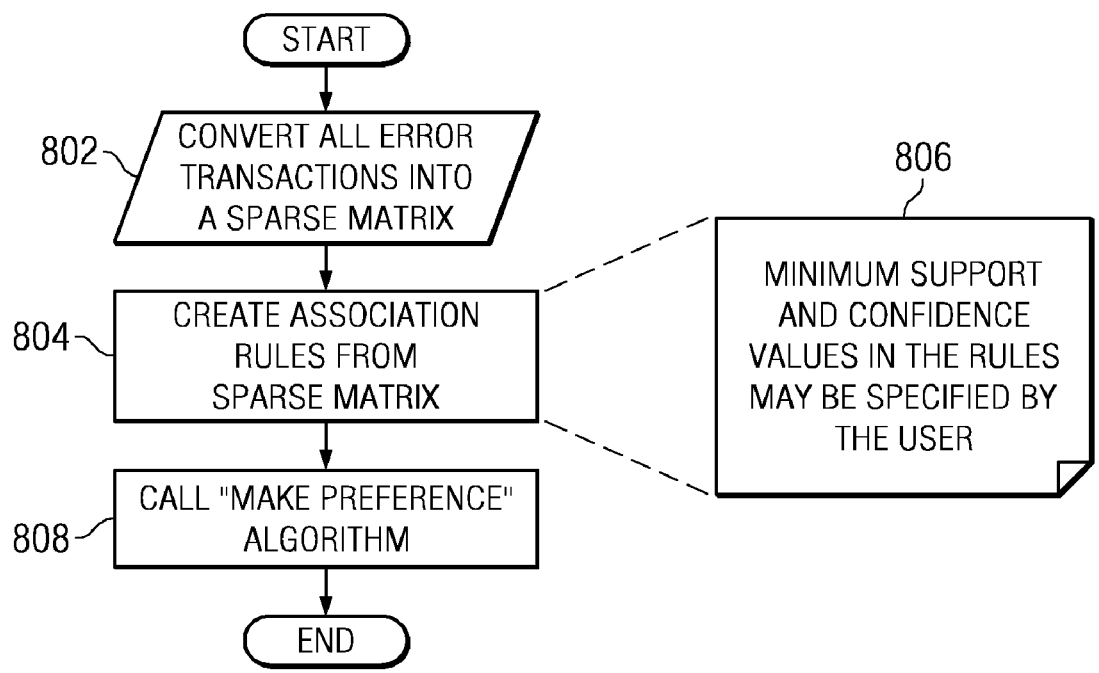
FIG. 8 is a flowchart of a process for creating association rules from errors in the graphical user interface error repository in accordance with the illustrative embodiments.
Figure 9:
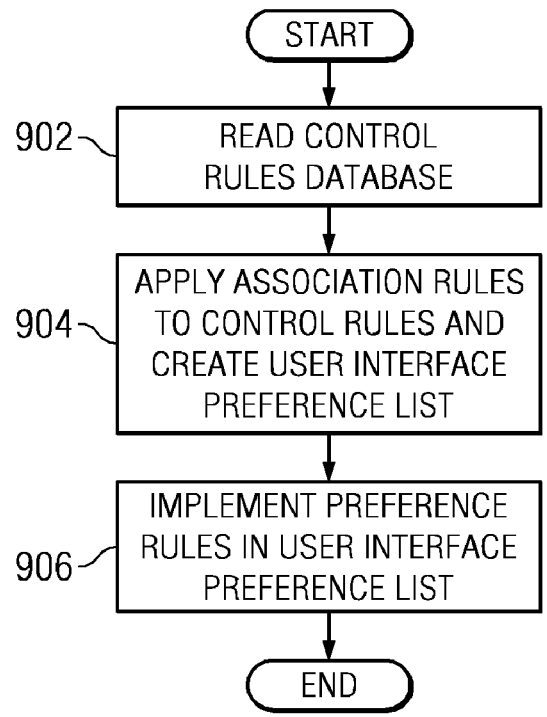
FIG. 9 is a flowchart of a process for converting association rules to a graphical user interface preference list in accordance with the illustrative embodiments.

FIGS. 7-9 describe a process for improving graphical user interfaces using an automated learning system. In particular, FIG. 7 is a flowchart of a process for creating a graphical user interface error repository in accordance with the illustrative embodiments. An example of the graphical user interface error repository is error transaction database 500 in FIG. 5.

The process begins when a user enters data into one or more elements in a graphical user interface (step 702). The system processes the entered data (step 704). The system then makes a determination whether the data entered into the graphical user interface is valid (step 706). If the data entered is valid ('yes' output of step 706), the user has successfully navigated the user interface, and the process ends.

If the data entered is not valid ('no' output of step 706), the system throws an error against the user interface elements which contain invalid values (step 708). The system then adds the errors to a list of errors (step 710), with the process terminating thereafter. The list of errors may be stored in a database table, such as error transaction database table 500 in FIG. 5. The list of errors may be used as a knowledge base to improve the graphical user interface to assist subsequent users in navigating through the interface by first creating association rules for the list of errors, which is described further in FIG. 8 below.

FIG. 8 is a flowchart of a process for creating association rules from errors in the graphical user interface error repository in accordance with the illustrative embodiments. This process may be implemented upon creating an error list as described in FIG. 7. The process begins with taking the error list created in FIG. 7 and converting the error transactions into a sparse matrix (step 802). Association rules may then be created from the sparse matrix (step 804). The association rules specify the association of an error in the graphical user interface to the user interface element that caused the error, as well as the minimum support and confidence values of the association rules. The minimum support and confidence values in the rules may be specified by the user (step 806). Once the association rules are created, a call to the "make preference" algorithm may be made (step 808), with the process terminating thereafter. The "make preference" algorithm converts the association rules to a graphical user interface preference list, which is described further in FIG. 9 below.

FIG. 9 is a flowchart of a process for converting association rules to a graphical user interface preference list in accordance with the illustrative embodiments. The process begins with reading control rules specified in the control rules database (step 902). The association rules are applied to the control rules to create a user interface preference list (step 904). For example, Rule1 in the <control rule> section may be applied to the corresponding user interface elements for the error (E2) in <error name>. The user interface preference list comprises a list of preferences which indicate how the user interface elements should be changed based on the errors encountered and the specified preferences. The rules specified in the user interface preference list may then be implemented as user interface preferences rules (step 906), with the process terminating thereafter. The rules may be implemented by providing the preference rules to a developer developing or designing the user interface form, or by dynamically implementing the preferences on the user interface form. In this manner, the illustrative embodiments provide the ability to identify users' component preferences for various user interface controls, as well as provide this preference information to a human developer or dynamically implement the preferences on the user interface.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The computer-readable storage medium can be an electronic, magnetic, optical, electromagnetic, infrared, or semiconductor system, apparatus, or device. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for changing a graphical user interface, the computer implemented method comprising:
   displaying a form comprising a plurality of elements on a graphical user interface;
   responsive to receiving an input into an element in the plurality of elements, determining whether the input was a valid input for the element;
   responsive to determining that the input was not the valid input for the element, identifying the input as an error; and creating, using a processing unit, associations between the error and the elements in the form which generated the error by storing information about the error and the element in the form on the graphical user interface which caused the error in a database table and converting information about all transactions in the database table into a sparse matrix, wherein the sparse matrix includes rows comprising a list of transactions and columns comprising a list of errors and corresponding elements for each transaction;
   identifying a set of user preference rules, wherein one or more rules in the set of user preference rules include a user preferred change to be made to a particular element in the form when a particular type of error associated with the particular element has occurred;

modifying one or more elements in the form displayed on the graphical user interface according to a user preference from the set of user preference rules that is particular to the error that has occurred.

2. The computer implemented method of claim 1 further comprising:
providing the set of user preference rules and information about the error to a graphical user interface developer.

3. The computer implemented of claim 1, wherein modifying the one or more elements in the form in the graphical user interface comprises:
responsive to identifying the particular type of error that occurred and the particular element in the graphical user interface associated with the particular type of error, changing an input type of a text box in the form displayed on the graphical user interface from a text entry type to a drop-down list box type according to the set of user preference rules.

4. The computer implemented method of claim 1, wherein creating the associations between the error and the element in the form which generated the error further comprises:
using a mining algorithm to identify a frequently occurring error and element sets from the sparse matrix; and
using the frequently occurring error and the element sets to create association rules.

5. The computer implemented method of claim 1, wherein modifying the one or more elements in the form in the graphical user interface comprises:
adding additional elements to the plurality of elements in the form displayed on the graphical user interface.

6. The computer implemented method of claim 1, wherein the element in the form displayed on the graphical user interface is a username text box and wherein modifying the one or more elements in the form in the graphical user interface comprises:
responsive to identifying that the error is an invalid user input of a name into the username text box, replacing the username text box with a first text box, a second text box, and a drop-down box.

7. The computer implemented method of claim 6, wherein a valid entry for the username text box is an email address and wherein the first text box is configured to accept a username, the second text box is configured to accept a service provider name, and the drop-down box includes a list of domain names.

8. A data processing system for changing a graphical user interface, the data processing system comprising:
a bus;
a storage device connected to the bus, wherein the storage device contains computer usable code;
at least one managed device connected to the bus;
a communications unit connected to the bus;
a processing unit connected to the bus, wherein the processing unit executes the computer usable code to:
display a form comprising a plurality of elements on a graphical user interface;
determine whether an input into an element in the plurality of elements was a valid input for the element in response to receiving the input into the element;
identify the input as an error and create associations between the error and the elements in the form which generated the error by storing information about the error and the element in the form on the graphical user interface which caused the error in a database table and converting information about all transactions in the database table into a sparse matrix, wherein the sparse matrix includes rows comprising a list of transactions and columns comprising a list or errors and corresponding elements for each transaction; and
identify a set of user preference rules, wherein one or more rules in the set of user preference rules include a user preferred change to be made to a particular element in the form when a particular type of error associated with the particular element has occurred and modify one or more elements in the form displayed on the graphical user interface according to a user preference from the set of user preference rules that is particular to the error that has occurred in response to determining that the input was not the valid input for the element.

9. The data processing system of claim 8, wherein the processing unit further executes the computer usable code to provide the set of user preference rules and information about the error to a graphical user interface developer.

10. The data processing system of claim 8, wherein in executing the computer usable code to modify the one or more elements in the form in the graphical user interface the processing unit further executes the computer usable code to change an input type of a text box in the form displayed on the graphical user interface from a text entry type to a drop-down list box type according to the set of user preference rules.

11. The data processing system of claim 8, wherein in executing the computer usable code to create the associations between the error and the element in the form which generated the error the processing unit further executes the computer usable code to use a mining algorithm to identify a frequently occurring error and element sets from the sparse matrix, and use the frequently occurring error and the element sets to create association rules.

12. The data processing system of claim 8, wherein in executing the computer usable code to modify the one or more elements in the form in the graphical user interface the processing unit further executes the computer usable code to add additional elements to the plurality of elements in the form displayed on the graphical user interface.

13. A computer program product for changing a graphical user interface, the computer program product comprising:
a computer readable storage medium having computer usable program code tangibly embodied thereon, the computer usable program code comprising:
computer usable program code for displaying a form comprising a plurality of elements on a graphical user interface;
computer usable program code for determining whether an input into an element in the plurality of elements was a valid input for the element in response to receiving the input into the element;
computer usable program code for identifying the input as an error and, in response to determining that the input was not the valid input for the element, creating associations between the error and the element in the form which generated the error by storing information about the error and the element in the form on the graphical user interface which caused the error in a database table and converting information about all transactions in the database table into a sparse matrix, wherein the sparse matrix includes rows comprising a list of transactions and columns comprising a list of errors and corresponding elements for each transaction;
computer usable program code for identifying a set of user preference rules, wherein one or more rules in the set of user preference rules include a user preferred change to be made to a particular element in the form when a particular type or error associated with the particular element has occurred;

computer usable program code for modifying one or more elements in the form displayed on the graphical user interface according to a user preference from the set of user preference rules that is particular to the error that occurred.

14. The computer program product of claim 13, further comprising:

computer usable program code for providing the set of user preference rules and information about the error to a graphical user interface developer.

15. The computer program product of claim 13, wherein the computer usable program code for modifying the one or more elements in the form in the graphical user interface comprises:

computer usable program code for changing an input type of a text box in the form displayed on the graphical user interface from a text entry type to a drop-down list box type according to the set of user preference rules in response to identifying the particular type or error that occurred and the particular element in the graphical user interface associated with the particular type of error.

16. The computer program product of claim 13, wherein the computer usable program code for creating the associations between the error and the element in the form which generated the error comprises:

computer usable program code for using a mining algorithm to identify a frequently occurring error and element sets from the sparse matrix;

computer usable program code for using the frequently occurring error and the element sets to create association rules.

17. The computer program product of claim 13, wherein the computer usable program code for modifying the one or more elements in the form in the graphical user interface comprises:

computer usable program code for adding additional elements to the plurality of elements in the form displayed on the graphical user interface.

* * * * *